(No Model.)

W. L. SHEPARD.
SWINGING PIPE JOINT.

No. 462,222. Patented Oct. 27, 1891.

Witnesses
H. A. Gidding
A. B. Jenkins

Inventor
Wilbur L. Shepard
by Simonds & Burdett,
Attys.

UNITED STATES PATENT OFFICE.

WILBUR L. SHEPARD, OF HARTFORD, CONNECTICUT.

SWINGING-PIPE JOINT.

SPECIFICATION forming part of Letters Patent No. 462,222, dated October 27, 1891.

Application filed June 30, 1891. Serial No. 398,024. (No model.)

*To all whom it may concern:*

Be it known that I, WILBUR L. SHEPARD, of Hartford, in the county of Hartford and State of Connecticut, have invented certain new and useful Improvements in Swinging-Pipe Joints, of which the following is a full, clear, and exact description, whereby any one skilled in the art can make and use the same.

The object of my invention is to provide a joint that is particularly adapted for use in uniting several lengths of pipe that have to be flexible, so as to permit a movement of the several parts to which the ends of the respective pipe-sections are connected. It is particularly adapted for use in uniting sections of steam-pipe that are used in connection with a hydraulic press the plates of which are heated by steam, as well as for other purposes where it is desirable to maintain the joint tight under a considerable pressure of fluid flowing through the pipes, and where the several sections have a swinging action on the joint.

My invention consists in the detail of the several parts making up the joint as a whole and in combination, as more particularly hereinafter described, and pointed out in the claims.

Figure 1:
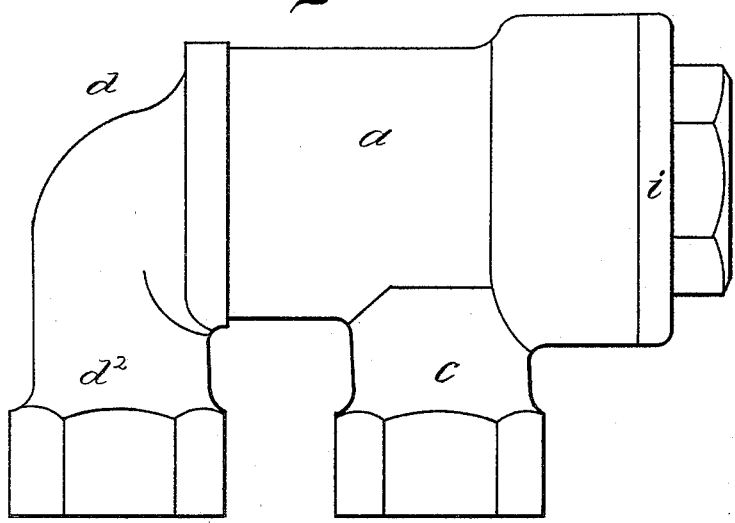
Figure 2:
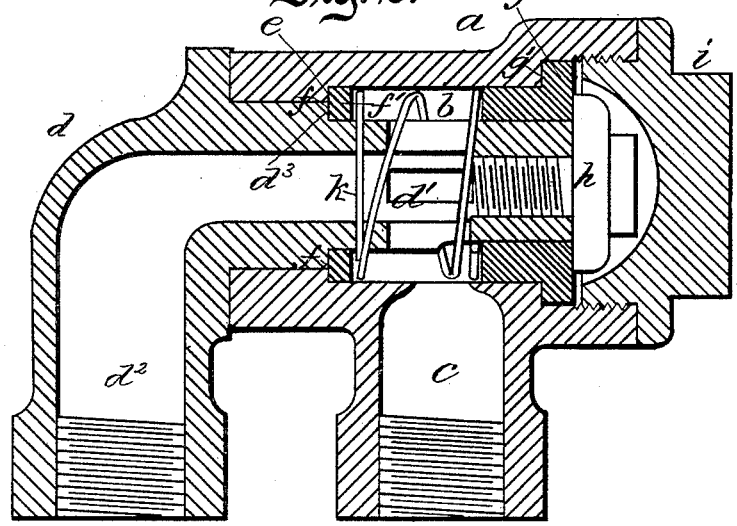

Referring to the drawings, Figure 1 is a detail view in side elevation of a joint. Fig. 2 is a detail view in the central lengthwise section of the pipe-joint.

In the accompanying drawings, the letter $a$ denotes the body part or main section of the joint that is preferably cast to shape, and is provided with a plug-socket $b$ and a branch $c$, the latter being preferably arranged at right angles with the body part and projecting from the side of the body part. The other joint-section $d$ comprises a plug $d'$, that is adapted to fit in the plug-socket in the body part $a$ and the branch $d^2$, that is adapted to be connected to a length of pipe. The body part is chambered to provide for the plug-socket, and it has a shoulder $e$ at the end, through which the plug projects into the socket, the plug at this part forming a close joint, the end of the body part fitting against the flange $d^3$ at the base of the plug. The plug is turned down within the chamber to a size that will provide a packing-seat $f$ at one end of the chamber, the joint between the parts being so located as not to be a continuation of either the inner wall of the chamber in the body part or of the surface of the smaller portion of the plug. The object of this arrangement of the joint is to enable a packing to be placed at the end of the chamber and to overlie the joint, the shoulders on the respective parts forming the end wall of the chamber and the packing-seat, as already described. The smaller end of the plug is provided with a flanged collar $g$, that is preferably adapted to be attached to the end of the plug by means that cause the collar to rotate within the plug. The end of the latter has a threaded hole in which a screw $h$ is arranged as a means of holding the two sections of the joint together, the head of the screw overhanging the collar and the flange of the latter resting upon a shoulder $g'$, formed in the body part.

The end of the chamber is closed by a screw-cap $i$, that is secured to the body part $a$ by any convenient means, as by a threaded portion fitting a threaded socket in said body part. This cap is provided with any convenient means for securing it to or removing it from the part to which it is fitted.

The annular packing $f'$ may be of any convenient material, and it is fitted to its seat and held there while steam or other fluid is passing through the joint by the pressure of such fluid, and at other times is preferably held by a spring $k$, that is arranged about the plug within the chamber and rests against the collar at one end and against the surface of the packing at the other end of the chamber. The plug is chambered out and provided with ports for the free passage of steam or other fluid.

In a pipe-joint constructed in accordance with my improvement the frictional wear due to the rotary movement of the parts one upon the other comes directly upon the metallic portion of the joint, so that the joint as a whole is extremely tight and durable.

There is but one joint that requires to be packed, and that is arranged within the chamber, as described, and so located that the annular packing thoroughly and effectually covers the joint and prevents leakage. The thorough test of this swinging joint for many weeks in actual use in a line of pipe within which steam was flowing under a considerable pressure has demonstrated the practical value of my improvement.

I claim as my invention—

1. In combination, in a pipe-joint, the sections having a fluidway therethrough and interengaging parts with shoulders on both within one of the parts, forming a packing-seat that extends across the closed joint between said parts, means for securing the joint-sections together, and an annular packing located on the said seat within the chambered section and covering the said closed joint, all substantially as described.

2. In combination, in a pipe-joint, the two sections having a fluidway therethrough, the main section having a chamber, a joint-section having a plug located within the chamber, the packing-seat extending across the joint between the two sections, the flanged collar secured to the end of the plug, the packing covering the said joint, and the spring located between and thrusting against the packing and the opposite end wall of the chamber, all substantially as described.

3. In combination, in a pipe-joint, the sections having a fluidway therethrough, the main section having a chamber, the joint-section comprising a plug located within the chamber, fastening means for securing the joint-sections together, a packing-seat within the chamber and extending across the joint between the two sections, and a packing within the chamber and covering said joint, all substantially as described.

4. In combination, in a pipe-joint, the sections having a fluidway therethrough, the main section having a chamber, the joint-section comprising the plug located within the chamber, the flanged collar secured to the end of the plug rotating with it, the screw-cap covering the said collar and its fastening means, the packing covering the joint within the chamber, and a spiral spring operating to hold the packing to its seat, all substantially as described.

WILBUR L. SHEPARD.

Witnesses:
CHAS. L. BURDETT,
A. B. JENKINS.